United States Patent Office 2,704,753
Patented Mar. 22, 1955

2,704,753

PROCESS FOR PREPARATION OF LOW MOLECULAR WEIGHT POLYMERS OF VINYL ACETATE

Leo J. Monaghan, Springfield, Mass., assignor to Shawinigan Resins Corporation, Springfield, Mass., a corporation of Massachusetts No Drawing. Application May 22, 1952,
Serial No. 289,437

3 Claims. (Cl. 260—89.1)

This invention relates to a new polymerization process for the preparation of polyvinyl acetate and relates, more particularly, to the preparation of low molecular weight polymers of this unsaturated ester. This application is a continuation-in-part of my co-pending application Serial No. 122,359 filed October 19, 1949, now abandoned.

It is well known that vinyl esters, such as vinyl acetate, may be polymerized to relatively low molecular weight polymers by the action of organic peroxides, such as acetyl peroxide, in a solvent system such as toluene. Large concentrations of peroxide catalysts must be used to obtain relatively short chain polymers resulting in undersirable side reactions and contamination in the product.

"Bead" or emulsion methods of polymerization also have not been successfully adapted to the production of short chain polymers. Large amounts of organic catalysts and chain transfer agents are required to decrease the molecular aggregation during polymerization. Low viscosity polymers, such as those having a viscosity below three centipoises (molar solution in benzene at 20° C.) are so fluid at polymerization temperatures that even excessive amounts of protective colloids will not prevent the polymer particles from agglomerating. The organic peroxidic catalysts and the chain transfer agents, at the concentrations at which they must be used in known systems increase the water sensitivity, decrease heat and light stability and leave unpleasant odors in the polymers.

Large concentrations of water-soluble catalysts, such as hydrogen peroxide, will not catalyze the formation of low viscosity vinyl ester polymers in an aqueous system. At concentrations which would be sufficient for low polymer formation, the catalyst decomposes rapidly and thereby loses its effectiveness.

It is an object of this invention to overcome the disadvantages of known polyvinyl polymerization processes and to provide low molecular weight polyvinyl acetate which is free of the usual contaminants and residues associated with resins polymerized by the previously known processes.

It is a further object of this invention to provide odorless and tasteless polyvinyl acetate suitable for a chewing gum base.

These and other objects are accomplished by polymerizing vinyl acetate by the action of hydrogen peroxide in a medium containing water, a small acount of alkali metal salt of an organic acid and an alkyl ketone, and separating the polymer, after it has formed, from the polymerization medium.

This is not an emulsion or bead polymerization system. These low polymers are fluid at the reaction temperatures. With small amounts of water, it is a one-phase system but with slightly more than the miniumum amount, the water and polymer dissolved in ketone and monomer form a two-phase system.

The following examples explain and illustrate but are not to be taken as limitations of the invention. Where parts are mentioned, they are parts by weight.

*Example I*

One hundred parts of vinyl acetate, 81 parts of methyl ethyl ketone, 25 parts of water, 0.17 part of sodium bicarbonate and 0.22 part of hydrogen peroxide were placed in a reaction vessel and agitated under reflux for 3 hours. The batch temperature was then slowly increased and the condenser set to remove rather than return the vapors. Sufficient water was added to the reaction mixture during the removal of the vapors, to at least maintain a slurry of the soft polymer in water. The vapors, containing methyl ethyl ketone and unreacted vinyl acetate with some water, were driven off as the batch temperature was increased to 95° C. When most of the ketone had been removed, the precipitated polymer was allowed to settle from the water layer and was then drawn from the reaction kettle through a bottom valve. It was then dried in vacuo at 60° C. for 5 hours.

One molar solution of the dried polymer in benzene had a viscosity of 1.44 centipoises at 20° C. The solid polymer withstood heating at 160° C. for 3 hours without discoloring. 83.4 parts of the product were produced from the monomer charged.

*Example II*

This example shows the customary process and product obtained from one of the known processes for producing low molecular weight polyvinyl esters.

The following materials were charged into a reaction vessel:

100 parts of vinyl acetate
80 parts of methyl ethyl ketone
2.13 parts of acetyl peroxide This mixture was agitated under reflux conditions until 88% of the monomer had polymerized. At that time, the resin had dissolved in the methyl ethyl ketone. The solvent and excess monomer were evaporated from the resin. The viscosity of the product measured 1.39 centipoises at 20° C. This resin had a disagreeable odor and became amber-colored after heating for three hours at 160° C.

When methyl isobutyl ketone is substituted for methyl ethyl ketone in this system, the product is not quite so color-stable as the one obtained in the methyl ethyl ketone system.

*Example III*

Completely aqueous systems also do not provide a color-stable low polymer. The following experiment exemplifies a standard charge and technique.

The materials charged into a polymerization vessel were:

100 parts of water
94 parts of vinyl acetate
5 parts of acetaldehyde
5 parts of benzoyl peroxide After refluxing for 2 hours under agitation, the polymer was washed with water and dried in vacuo at 25° C. The color of the polymer after it had been heated for 3 hours at 160° C. was inferior to the polymer produced in Example II. The viscosity of the one-molar solution of the product was 1.19 centipoises at 20° C. A disagreeable odor was associated with the polymer which could not be eliminated by repeated washings in water or prolonged steam distillation.

At least 1.5 to 2.5 parts of hydrogen peroxide would be necessary to produce low polymers of vinyl acetate in a system similar to Example III. But, at these concentrations, the peroxide decomposes almost completely and the polymerization reaction stops.

*Example IV*

The following example demonstrates the use of methyl isobutyl ketone in this invention:

100 parts of vinyl acetate
86 parts of methyl isobutyl ketone
58 parts of water
0.38 part of potassium bicarbonate
0.49 part of hydrogen peroxide The constituents were charged simultaneously into a reaction vessel and processed as in Example I. The polymer was clear and did not discolor when heated. The viscosity of the polymer was 1.92 centipoises at 20° C.

*Example V*

For some applications, the extremely small traces of the ketone which may remain in the low polymer after separation from the reaction medium may be undesirable. In those cases, the following exemplifies an excellent method of obtaining an exceedingly pure polymer.

The following constituents were charged into a clean jacketed polymerization kettle:

100 parts of vinyl acetate
81 parts of methyl ethyl ketone
56 parts of water
0.3 part of hydrogen peroxide
0.25 part of sodium bicarbonate This mixture was agitated under reflux conditions for 300 minutes, after which time 83% of the monomer had been polymerized.

The batch was then heated slowly to 97° C. and the vapors removed without rectification. 100 parts of water were added during the distillation step to maintain a sufficient volume in the kettle for agitation. The precipitated polymer was then allowed to settle from the water layer containing the sodium salts, unreacted catalyst and a small amount of ketone. The hot polymer was then pumped into a steam still for 15 minutes for final purification to remove the last small traces of ketone.

The product, after drying at 120° C. for one hour, was tasteless, odorless and colorless. The viscosity of a one-molar solution of the polymer in benzene was 1.41 centipoises. This product which contained no detectable organic or inorganic impurities is ideally suitable for use as a chewing gum base. Another method of treating the polymer in place of steam distillation is to wash the polymer several times with hot water (75 to 100° C.).

*Example VI*

Diethyl ketone is also suitable for this process. In the same equipment as that used in Example V, the following charge produced an extremely low viscosity polymer:

100 parts of vinyl acetate
94 parts of diethyl ketone
50 parts of water
1.25 parts of hydrogen peroxide
0.97 part of sodium bicarbonate This mixture was refluxed for 220 minutes, then the unreacted monomer and ketone was steam distilled. A molar solution of the product had a viscosity of 1.38 centipoises at 20° C. The steam distillate contained 26 parts of unreacted vinyl acetate.

*Example VII*

94 parts of methyl propyl ketone substituted in this charge for the diethyl ketone of Example VI, yielded a 1.28 centipoise product after 180 minutes at reflux. 61% of the vinyl acetate had polymerized.

*Example VIII*

A more economical way to operate this process is to delay the addition of the vinyl acetate to the reaction vessel. For example, the following materials were charged to a reaction vessel which was fitted with means by which liquids could be added during the reaction.

100 parts of vinyl acetate
200 parts of methyl ethyl ketone
20 parts of water
0.62 part of hydrogen peroxide
0.50 part of sodium bicarbonate This mixture was heated to reflux temperature and then 300 parts of vinyl acetate were added slowly over a period of 180 minutes. After 240 minutes at reflux temperature, 75% of the vinyl acetate had polymerized. The polymer was separated and dried. A molar solution of the product in benzene had a viscosity of 1.5 centipoises at 20° C.

*Example IX*

Another example of this delayed addition technique to obtain a more viscous product is as follows:

INITIAL CHARGE 100 parts of vinyl acetate
105 parts of methyl ethyl ketone
20 parts of water
0.2 part of hydrogen peroxide
0.125 part of sodium bicarbonate

DELAYED ADDITION 300 parts of vinyl acetate were added to the refluxing initial charge over a period of 90 minutes. After a total time of 150 minutes at reflux, 75% of the vinyl acetate had polymerized. The polymer had a viscosity of 2.6 centipoises at 20° C.

It will be noted that less hydrogen peroxide and less ketone are necessary by using this delayed addition technique. In addition to these savings, larger batches may be made with greater safety.

As is evident from the above examples, the invention is particularly suited for the production of vinyl acetate polymers having viscosities of 3 centipoises and below. The advantages of this new process make it particularly desirable where usual methods of polymerization would require the use of large concentrations of peroxidic catalysts and polymerization modifiers such as aldehydes.

Hydrogen peroxide has been found to be most suitable as a catalyst for this new process. Other peroxides such as acetyl peroxide, benzoyl peroxide, lauryl peroxide and the like must be used in higher and subsequently dangerous concentrations and they leave undesirable products in the polymer, which are not removed with the water layer. Hydrogen peroxide must be used, however, in conjunction with a very small amount of an alkali metal salt of an organic acid.

At least 0.01 mol of these salts must be added for every mol of hydrogen peroxide to effect polymerization of the monomer. From 0.1 to 2.0 mols of salt for every mol of hydrogen peroxide will contribute to the maximum polymerization of the monomer but as high as 4 mols of salt may be used for every mol of peroxide without decreasing the yield. It is not desirable to exceed this ratio, however, because the excess must be removed in the water layer. In general, for polymers in the 1–3 centipoise range, 0.2 to 1.0 mol of the alkali metal salts per mol of hydrogen peroxide is the preferred range. Below a 0.2:1 ratio, the conversion decreases slightly; above the 1:1 ratio, the extent of polymerization is not changed significantly.

The alkali metal salts suitable for use in the process include the water-soluble salts of sodium, potassium, lithium or cesium and organic acids. Examples of the organic acids include the aliphatic and aromatic acids such as acetic, benzoic, carbonic, citric, lactic, maleic, oxalic, phthalic, salicylic, succinic, tartaric, and the like.

The molecular weight of the polymer is partially dependent upon the amount of hydrogen peroxide in the charge. Within limits, increasing the peroxide concentration will decrease the extent of molecular aggregation. In contrast to other low polymer processes in which large amounts of organic or inorganic peroxides must be used, as little as 0.01 part of hydrogen peroxide per 100 parts of monomer will produce a fairly low viscosity polyvinyl acetate by the present process. As stated above, however, some alkali metal salt of an organic acid must be present in such a system. For polymers between 1 and 3 centipoises in viscosity, 0.02 to 1.0 part of hydrogen peroxide per 100 parts of monomer will produce the desired result. For example, the following charge will produce a 1.48 centipoise viscosity polyvinyl acetate after 180 minutes at reflux:

100 parts of vinyl acetate
81 parts of methyl ethyl ketone
50 parts of water
1.27 parts of hydrogen peroxide
0.67 part of sodium bicarbonate If the hydrogen peroxide is reduced to 0.22 part and the sodium bicarbonate to 0.15 part, 180 minutes at reflux will produce a polymer with a viscosity of 1.47 centipoises. It appears that increasing the peroxide beyond a certain relatively low point has no effect on the polymer viscosity.

The presence of water in the process of this invention is critical. Under anhydrous conditions, no significant polymerization will occur. As little as 2 parts of water will allow the polymerization to proceed but at least 4 parts per 100 parts of vinyl acetate are needed to achieve economical rates. The extent of conversion approaches the maximum with 5 parts of water per 100 parts of monomer and further increases in the water content have little effect on the extent of the reaction. When the polymer is separated from the water by decanting or other means, some water-soluble impurities are removed. For this purpose, more than the amount necessary for polymerization is desirable but this excess may be added after the reaction is essentially completed. The upper limit on the amount of water added is the capacity of the polymerization vessel. No significant improvement in the product is attained, however, in having large amounts of water present during the reaction.

The preferred organic liquids for this process must be solvents for the polyvinyl acetate and must not introduce into the polymer chain a substantial number of groups that would impart undesirable properties to the resin. The major portion of the solvent must be a ketone having the formula:

in which the R and R¹ are the same or different alkyl groups containing from 1 to 7 carbon atoms. If another solvent is used in conjunction with the ketone, it must be incapable of associating with or adding to the growing polymer chain.

Ketones such as acetone, methyl ethyl ketone, diethyl ketone, methyl isopropyl ketone, methyl isobutyl ketone and the like are compounds which have been found to be sufficiently active to yield low polymers, yet they do not contaminate the polymer. The polymers produced in reaction media containing ketones are especially desirable for applications requiring odorless and tasteless properties in the resin. There must be a sufficient amount present to obtain the low molecular weight polymer and not such an excess that distilling the solvent out of the polymer would lengthen the process time to an uneconomic cycle.

Also in this regard, the concentrations of the ketone have a definite influence upon the viscosity of the product. As an illustration of this effect, when the amount of methyl ethyl ketone is reduced to 65 parts in a reaction identical to that illustrated in Example I which used 81 parts, the polymer viscosity increased from 1.44 to 1.51 centipoises. This viscosity increase, though slight, represents a substantial increase in the molecular weight of the polymer. Taking all factors into account, between 20 and 180 parts of ketone per 100 parts of monomer is the range within which the polymer desired can be formed. Less than 20 parts will not produce a polymer having a viscosity below 3 centipoises with normal catalyst concentrations. The use of more than 180 parts does not have any appreciable effect on the viscosity of the polymer.

The reaction time is not critical. Economic considerations call for continuing the reaction to maximum conversion but it may be stopped short of this point.

The examples given above illustrate typical batch polymerizations. This invention may also be utilized in continuous or semi-continuous operations. The constituents may be continuously fed into a polymerization kettle with the overflow directed into one of two or more "finishing kettles." In these kettles, the polymerization is completed and the polymer separated from the reaction medium. More than one "finishing kettle" is usually needed to accommodate the continuous overflow in one kettle while the separation step is accomplished in the other It is desirable, under some circumstances, and in certain equipment, to control the polymerization within narrow limits. This may be done by adding either the hydrogen peroxide or the monomer, or both, to the reaction mixture over an extended period. This technique is recommended in the cases where the heat of polymerization cannot be dissipated rapidly. Examples VIII and IX show some other advantage of this technique. The reaction is usually carried out at reflux temperature but it may be carried out at temperatures below this or even above 100° C. if the reaction vessel can be pressurized. For economic reasons however, the monomer is usually polymerized at tempeartures between 60 and 100° C.

The polymer may be separated from the reaction mixture in a number of ways. Distillation of the organic solvent and the unreacted monomer is a preferred step in the separation because the unrectified distillate can be recycled. Decantation of the water layer from the precipitated polymer is an efficient method of separation. If superlative purity of product is desirable, a short period in a steam still will remove the last traces of unreacted monomer and organic solvent.

The low polymers of vinyl acetate may be used as a starting material in the manufacture of polyvinyl alcohols by acid or alkaline hydrolysis or alcoholysis; for impregnating porous materials; in coating compositions in which the polymer may be modified with pigments, plasticizers, extenders, etc.; or as a chewing gum base.

It will be understood that various modifications may be made in the details of the invention described above without departing from the spirit and scope thereof, as defined in the appended claims.

What is claimed is:

1. A process of producing polyvinyl acetate having viscosities within the range of from about 1 to 3 centipoises (in a one-molar solution in benzene at 20° C.), which comprises heating under reflux at temperatures between 60° C. and 100° C. and agitating a system composed of 100 parts of vinyl acetate monomer, from 0.02 to 1.0 part of hydrogen peroxide, a water-soluble alkali metal salt of an organic carboxylic acid, at least 4 parts of water and from 20 to 180 parts of an organic solvent for the polyvinyl acetate, the major portion of which solvent is a ketone having the formula:

in which R and R¹ are alkyl groups containing from 1 to 7 carbon atoms, distilling solvent from the reaction mixture when monomer conversion has reached the desired extent and then separating the polymer from the aqueous portion of the reaction mixture, the alkali metal salt being present in the ratio of 0.2 to 1.0 mol for every mol of hydrogen peroxide, the said system not forming a stable aqueous emulsion.

2. A process in accordance with claim 1 wherein the separated polymer is subjected to the action of water at temperatures between 75° C. and 100° C.

3. A process in accordance with claim 1 wherein the organic solvent is methyl ethyl ketone.

References Cited in the file of this patent

UNITED STATES PATENTS

| | | |
|---|---|---|
| 2,440,318 | White et al. | Apr. 27, 1948 |
| 2,485,141 | Cornthwaite et al. | Oct. 18, 1949 |